US009008073B1

(12) United States Patent
Razazian et al.

(10) Patent No.: US 9,008,073 B1
(45) Date of Patent: Apr. 14, 2015

(54) ROUTING FOR POWER LINE COMMUNICATION SYSTEMS

(71) Applicant: Maxim Integrated Products, Inc., San Jose, CA (US)

(72) Inventors: Kaveh Razazian, Aliso Viejo, CA (US); Afshin Niktash, Irvine, CA (US); Victor Loginov, Irvine, CA (US); Kenneth E. Garey, Irvine, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 185 days.

(21) Appl. No.: 13/708,008

(22) Filed: Dec. 7, 2012

(51) Int. Cl.
*H04L 12/28* (2006.01)
*H04L 12/733* (2013.01)

(52) U.S. Cl.
CPC .................... *H04L 45/122* (2013.01)

(58) Field of Classification Search
None
See application file for complete search history.

(56) References Cited

U.S. PATENT DOCUMENTS

| | | | | | |
|---|---|---|---|---|---|
| 6,088,436 | A | * | 7/2000 | Mashinsky | 379/210.01 |
| 6,985,072 | B2 | * | 1/2006 | Omidi et al. | 370/203 |
| 7,158,889 | B2 | * | 1/2007 | Hussan et al. | 702/19 |
| 7,760,711 | B1 | * | 7/2010 | Kung et al. | 370/352 |
| 7,881,695 | B2 | * | 2/2011 | Iwamura | 455/402 |
| 8,315,152 | B2 | * | 11/2012 | Razazian et al. | 370/208 |
| 8,464,196 | B1 | * | 6/2013 | Lawson et al. | 716/126 |
| 2002/0021770 | A1 | * | 2/2002 | Beerel et al. | 375/340 |
| 2002/0145509 | A1 | * | 10/2002 | Karny et al. | 340/310.06 |
| 2003/0093801 | A1 | * | 5/2003 | Lin et al. | 725/90 |
| 2003/0161268 | A1 | * | 8/2003 | Larsson et al. | 370/229 |
| 2004/0073702 | A1 | * | 4/2004 | Rong | 709/241 |
| 2004/0233928 | A1 | * | 11/2004 | Pozsgay | 370/446 |
| 2005/0063355 | A1 | * | 3/2005 | Iwamura | 370/351 |
| 2006/0269001 | A1 | * | 11/2006 | Dawson et al. | 375/257 |
| 2007/0038767 | A1 | * | 2/2007 | Miles et al. | 709/230 |
| 2007/0160081 | A1 | * | 7/2007 | Logvinov et al. | 370/469 |
| 2007/0189170 | A1 | * | 8/2007 | Pirbhai | 370/237 |
| 2007/0223360 | A1 | * | 9/2007 | Ichihara | 370/204 |
| 2007/0230497 | A1 | | 10/2007 | Choi et al. | 370/442 |
| 2007/0280199 | A1 | * | 12/2007 | Rong | 370/351 |
| 2008/0181133 | A1 | * | 7/2008 | Thubert et al. | 370/255 |
| 2008/0260352 | A1 | * | 10/2008 | Turner | 386/95 |
| 2009/0070357 | A1 | * | 3/2009 | Oh et al. | 707/101 |
| 2009/0103642 | A1 | * | 4/2009 | Galli et al. | 375/260 |
| 2009/0143010 | A1 | * | 6/2009 | Fukuda et al. | 455/41.1 |
| 2009/0158291 | A1 | * | 6/2009 | Kim et al. | 718/104 |
| 2009/0285165 | A1 | * | 11/2009 | Berglund et al. | 370/329 |
| 2010/0175097 | A1 | * | 7/2010 | Zhang | 725/109 |
| 2010/0195560 | A1 | * | 8/2010 | Nozaki et al. | 370/315 |
| 2010/0257386 | A1 | * | 10/2010 | Hanada et al. | 713/310 |
| 2010/0316140 | A1 | * | 12/2010 | Razazian et al. | 375/257 |
| 2011/0019381 | A1 | * | 1/2011 | Kawano et al. | 361/783 |
| 2011/0176416 | A1 | * | 7/2011 | Bhatti et al. | 370/230 |

(Continued)

*Primary Examiner* — Bunjob Jaroenchonwanit

(57) ABSTRACT

A power line communication (PLC) system includes a source node, a plurality of intermediate nodes and a destination node. Each of the source node, the plurality of intermediate nodes and the destination node comprise a PLC interface including a medium access control (MAC) module and a physical layer (PHY) module. A transformer is located between the source node and the destination node. Routing modules of the source node, one or more of the intermediate nodes, and the destination node establish a route from the source node to the destination node via one or more selected ones of the plurality of intermediate nodes. The route is selected using a route cost that is calculated based on link costs of a plurality of hops in the route from the source node to the destination node. The link costs are based on forward link costs and reverse link costs.

42 Claims, 9 Drawing Sheets

(56) References Cited

U.S. PATENT DOCUMENTS

| | | |
|---|---|---|
| 2011/0193719 A1* | 8/2011 | Monier .................... 340/870.02 |
| 2011/0249612 A1* | 10/2011 | Kubo et al. .................... 370/315 |
| 2012/0041696 A1* | 2/2012 | Sanderford et al. ............ 702/62 |
| 2012/0182881 A1* | 7/2012 | Ananthakrishnan et al. . 370/244 |
| 2012/0218120 A1* | 8/2012 | Ree et al. .................. 340/870.02 |
| 2012/0257639 A1 | 10/2012 | Vijayasankar et al. ....... 370/478 |
| 2012/0275298 A1* | 11/2012 | Bryant et al. .................. 370/225 |
| 2012/0280833 A1* | 11/2012 | Jonsson et al. ........... 340/870.02 |
| 2013/0003879 A1* | 1/2013 | Balleste et al. ................ 375/257 |
| 2013/0024706 A1* | 1/2013 | Katar et al. ................. 713/321 |
| 2013/0028104 A1* | 1/2013 | Hui et al. ...................... 370/252 |
| 2013/0101055 A1* | 4/2013 | Pande et al. .................... 375/257 |
| 2013/0223278 A1* | 8/2013 | Inada ............................ 370/254 |
| 2013/0250945 A1* | 9/2013 | Hui et al. ...................... 370/389 |
| 2014/0198861 A1* | 7/2014 | Galli et al. .................... 375/257 |

* cited by examiner

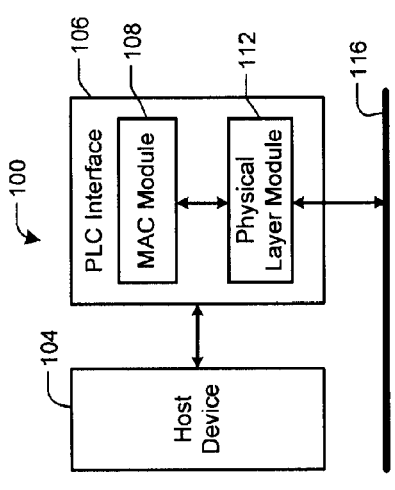
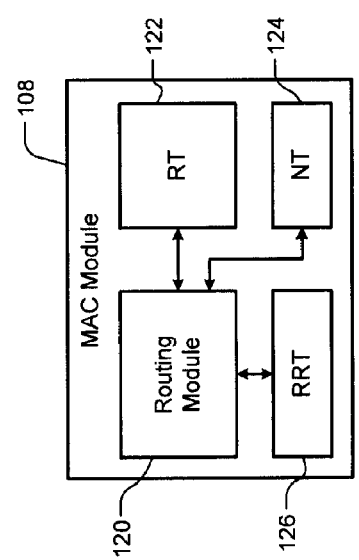

ROUTING FOR POWER LINE COMMUNICATION SYSTEMS

FIELD

The present disclosure relates to power line communication (PLC) systems, and more particularly to improved routing of packets in PLC systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power line communications (PLC) systems transmit and receive signals from a utility to homes over existing power lines in the homes. PLC systems have been used to provide connectivity between a utility and power meters, appliances and other devices located in the homes of consumers. Some of the challenges to the implementation of PLC systems include the relatively noisy environment of the power lines, implementation costs, and transmitting and receiving signals across a transformer.

SUMMARY

A power line communication (PLC) system includes a source node, a plurality of intermediate nodes and a destination node. Each of the source node, the plurality of intermediate nodes and the destination node comprise a PLC interface including a medium access control (MAC) module comprising a routing module. A physical layer (PHY) module, in communication with the MAC module, further includes a transceiver configured to transmit and receive data over a power line. The routing modules of the source node, one or more of the intermediate nodes, and the destination node establish a route from the source node to the destination node via one or more selected ones of the plurality of intermediate nodes. The route is selected using a route cost that is calculated based on link costs of a plurality of hops in the route from the source node to the destination node. The link costs are based on forward link costs and reverse link costs.

A method for operating a power line communication (PLC) system includes establishing a route from a source node to a destination node via one or more selected ones of a plurality of intermediate nodes. The method includes selecting the route using a route cost that is calculated based on link costs of a plurality of hops in the route from the source node to the destination node. The link costs are based on forward link costs and reverse link costs.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 2 is a functional block diagram of an example of a PLC device according to the present disclosure;

FIG. 3A is a functional block diagram of an example of a MAC module according to the present disclosure;

FIG. 3B illustrates examples of fields of a routing table of the MAC module according to the present disclosure;

FIG. 3C illustrates examples of fields of a route request table (RRT) of the MAC module according to the present disclosure;

FIG. 3D illustrates examples of fields of a neighbor table (NT) of the MAC module according to the present disclosure;

DESCRIPTION

Figure 1A:
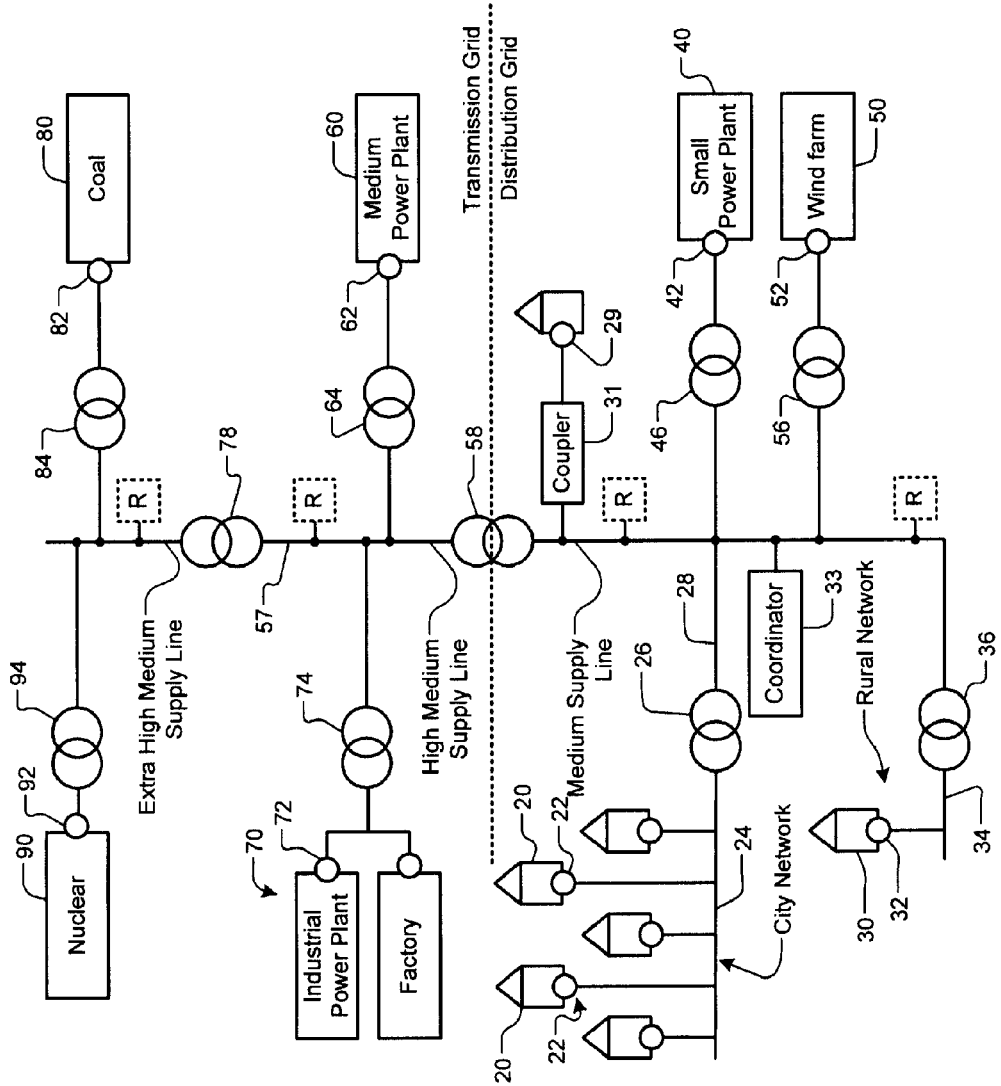
FIG. 1A illustrates an example of a PLC system according to the present disclosure.

Referring now to FIG. 1A, an example of a power system is shown. The power system includes a city network with one or more homes 20 that are connected by a PLC device 22 to a power line 24. The power line 24 is connected by a transformer 26 to a medium supply line 28. In some examples, a PLC device 29 may also be connected directly (without a transformer) to the medium supply line 28 by a coupler 31, which may serve as a network coordinator or a repeater. One or more network coordinators 33 may be connected to the medium supply line 28. The power system may also be connected via a transformer 36 to a rural network including one or more homes 30 connected by a PLC device 32 to a power line 34. The medium supply line 28 may also communicate with a PLC device 42 associated with a small power plant 40 through a transformer 46. The medium supply line 28 may also communicate with a PLC device 52 associated with a wind farm 50 through a transformer 56.

The medium supply line 28 may communicate with a high medium supply line 57 through a transformer 58. A PLC device 62 associated with a medium power plant 60 may communicate with the high medium supply line 57 through a transformer 64. A PLC device 72 associated with an industrial power plant and factory 70 may communicate with the high medium supply line 57 through a transformer 74.

An extra high medium supply line 76 may communicate with the high medium supply line 57 through a transformer 78. A PLC device 82 associated with a coal plant 80 may communicate with the extra high medium supply line 76 through a transformer 84. Likewise, a PLC device 92 associated with a nuclear plant 90 may communicate with the extra high-voltage line 76 through a transformer 94. One or more routers R or network coordinators (not shown) may be provided as intermediate nodes to receive, forward and route packets between the PLC devices.

As can be appreciated, the power system shown in FIG. 1A is simplified for discussion purposes. When attempting to communicate from one PLC device (referred to herein as a source node) to another PLC device (referred to herein as a destination node), a route through one or more intermediate nodes is initiated. If there is more than one route, one of the routes is selected. To ensure network performance, a selected route should be the best route from the source node to the destination node. The best route may be selected based on the quality of the links, the length of the path (in other words, the number of hops), congestion of a node (in other words, number of routes that go through the node), physical location and assignment of a function to a node (for example a node close to a transformer may be assigned to act as a preferred repeater) and/or other factors.

When a power line device is initially connected to the PLC system, the PLC device will need to identify neighbor nodes. When sending a packet to a destination node that is not a neighbor node, a source node will need to establish a route from the source node through intermediate nodes to the destination node.

Figure 1B:
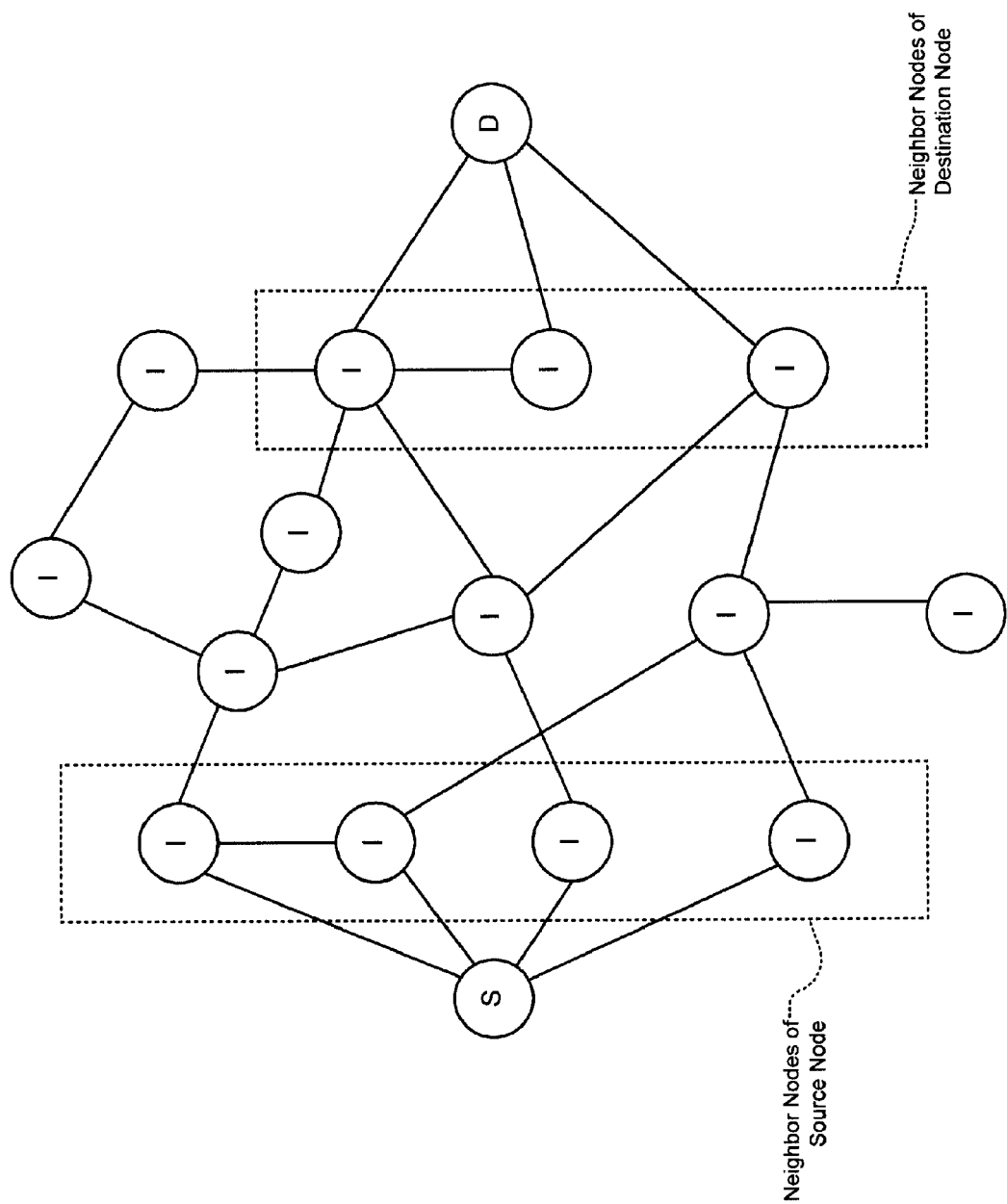
FIG. 1B illustrates an example of connections between a source node and a destination node through intermediate nodes.

Referring now to FIG. 1B, an example of connections between a source node and a destination node through intermediate nodes is shown. A source node S is connected to one or more intermediate nodes I, which are neighbor nodes to S. Additional intermediate nodes may connect the neighbor nodes of S to other intermediate nodes. One or more of the other intermediate nodes are neighbor nodes of a destination node D. The neighbor nodes of the destination node D forward packets to the destination node D. As can be appreciated, some of the routes between the source node S and the destination node D may be better routes than others of the routes. As will be described below, PLC devices according to the present disclosure identify one of the routes based on forward and reverse link costs.

In some examples, a transformer is located between the source node and the destination node. In other examples, communication can take place over the medium supply line without any transformer between source and destination nodes.

Referring now to FIGS. 2 and 3A, an example of a PLC device 100 is shown. The PLC device 100 includes a host device 104 and a PLC interface 106. The PLC interface 106 includes a medium access control (MAC) module 108 and a physical layer (PHY) module 112. In some implementations, the MAC module 108 includes both the Media Access Control Layer and an Adaptation Layer of the PLC device 100. The PHY module 112 provides connectivity with a medium such as a power line 116. The MAC module 108 performs higher-level processing of the transmitted and received data. In FIG. 3, the MAC module 108 includes a routing module 120, a routing table (RT) 122, a neighbor table (NT) 124 and a route request table (RRT). In some implementations, the routing module 120, the RT 122, the NT 124 and the RRT 126 may be located in the Adaptation Layer of the MAC module 108.

Figure 4A:
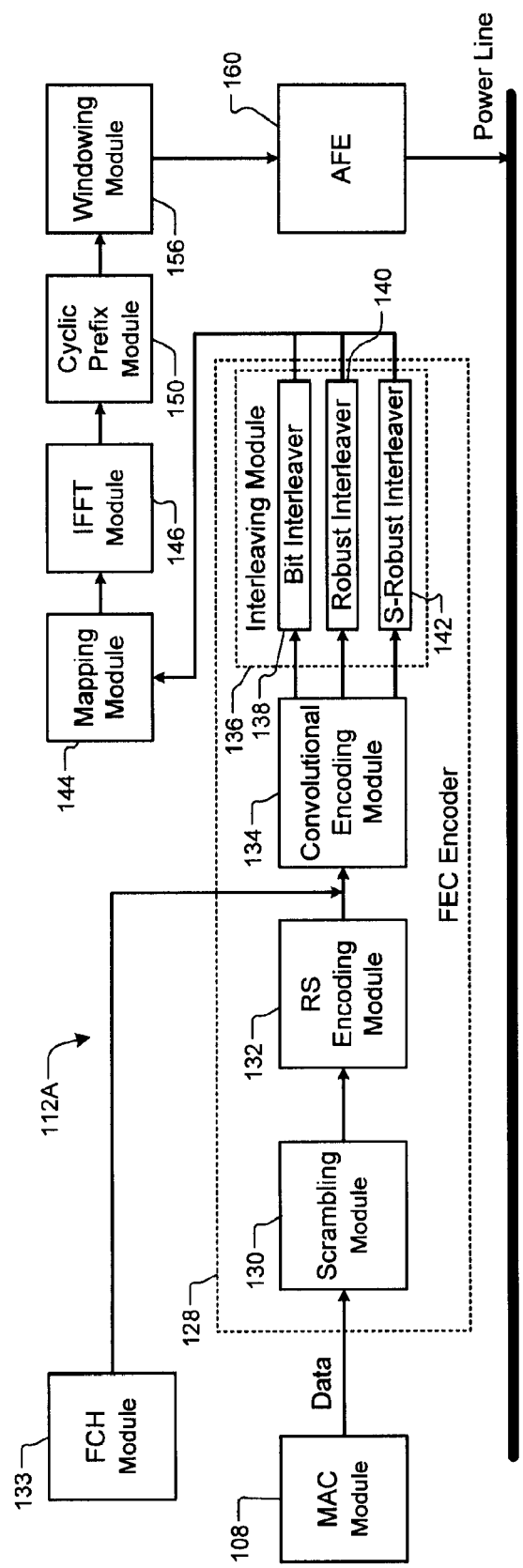
FIGS. 4A and 4B are functional block diagrams of examples of a transmitter and a receiver, respectively, according to the present disclosure.

Referring now to FIG. 4A, an example of a transmitter portion of the PHY module 112A is shown. The MAC module 108 outputs data to a forward error correction (FEC) encoding module 128. The FEC encoding module 128 performs encoding and includes a scrambling module 130 to scramble the data, a Reed Solomon (RS) encoding module 132 to perform RS encoding, a convolutional encoding module 134 to perform convolutional encoding and an interleaving module 136 to perform interleaving. An output of a frame control header (FCH) module generates a frame control header for the packets and communicates with an input of the convolutional encoding module 134.

The interleaving module 136 includes a bit interleaver 138, a robust interleaver 140 and a super robust interleaver 142. An output of the FEC encoding module 128 is input to a mapping module 144 that performs orthogonal frequency division multiplexing (OFDM) mapping such as but not limited to differentially-encoded binary phase shift keying (DBPSK), differentially-encoded quadrature phase shift keying (DQPSK) and/or other types of modulation. An output of the mapping module 144 is input to an inverse fast Fourier transform (IFFT) module 146. An output of the IFFT module 146 is input to a cyclic prefix module 150. An output of the cyclic prefix module is input to a windowing module 156. An output of the windowing module 156 is input to an analog front end 160.

Figure 4B:
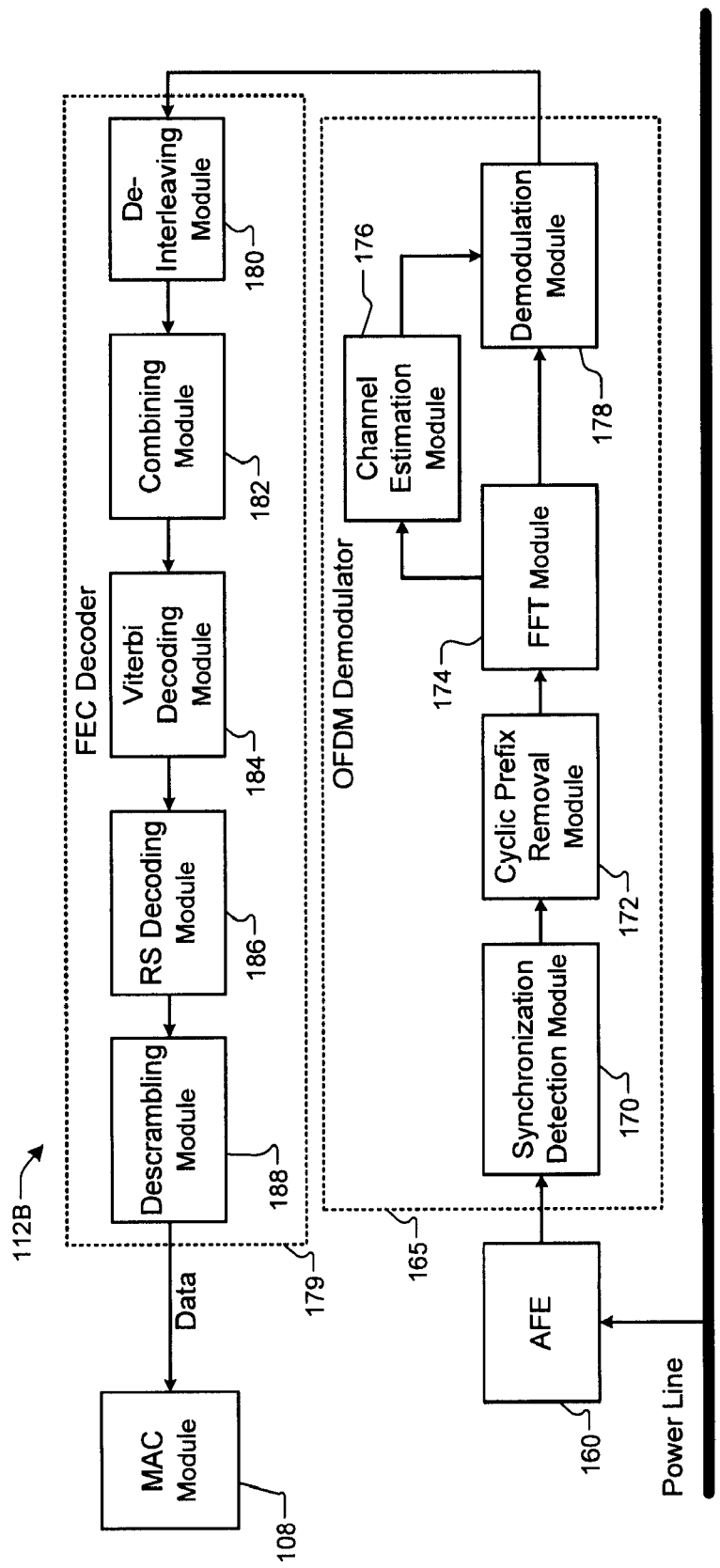

Referring now to FIG. 4B, an example of a receiver portion of the PHY module 112B is shown. The analog front end (AFE) 160 communicates with the power line and outputs a received signal to an OFDM demodulating module 165. The OFDM demodulating module 165 includes a synchronization detection module 170, a cyclic prefix (CP) removal module 172, a fast Fourier transform (FFT) module 174, a channel estimation module 176, and a demodulation module 178.

An output of the OFDM demodulating module 165 is input to a FEC decoding module 179. The FEC decoding module 179 includes a de-interleaving module 180, a combining module 182, a Viterbi decoding module 184, a RS decoding module 186 and a descrambling module 188. An output of the FEC decoding module 179 provides data to the MAC module 108.

Additional details relating to the transmitter and receiver modules described above can be found in "SYSTEM AND METHOD FOR APPLYING MULTI-TONE OFDM BASED COMMUNICATIONS WITHIN A PRESCRIBED FREQUENCY RANGE", U.S. Pat. No. 8,315,152, and "TRANSMITTER AND METHOD FOR APPLYING MULTI-TONE OFDM BASED COMMUNICATIONS WITHIN A LOWER FREQUENCY RANGE", U.S. patent application Ser. No. 12/795,537, filed on Jun. 7, 2010, which are both hereby incorporated by reference in their entirety.

The transceivers disclosed therein use a combination of adaptive tone mapping, interleaving in frequency and time, and robust and super-robust encoding modes to provide reliable communication on a power line channel. The transceivers may operate in a frequency band from 1 kHz to 600 kHz. The transceivers use adaptive tone mapping, which involves requesting a tone map from a link partner. The transceiver associated with the link partner performs channel estimation, generates the tone map and sends the tone map to the requesting transceiver. The requesting transceiver uses the tone map to update its NT and modulates an output of the encoding module to selected orthogonal tones located in the frequency band based on a mapping table received form the link partner. In some implementations, frequency pre-emphasis may be used to pre-emphasize at least one or more of the selected orthogonal tones to compensate for estimated attenuation during propagation of a transmitted signal. When using the foregoing signal processing techniques, the transceivers are able to transmit and receive across a transformer to the transceiver associated with the link partner.

The routing module 120 of the MAC module 108 selectively initiates a route discovery command, such as a LOAD command, when a source node needs to sends a packet to destination node when a route has not been established or is no longer valid to destination node. The LOAD procedure is described further in, K. Kim, S. Daniel Park, G. Montenegro, S. Yoo, N. Kushalnagar, "6LoWPAN ad hoc on-demand distance vector routing (LOAD)."

The route discovery command is designed to find an optimized route with a minimum route cost (RC) between two nodes in a network. The route discovery command generates and forwards unicast or broadcast route request (RREQ) packets from a source node to a destination node during a discovery period. The destination node determines the optimum discovered route. Then, the destination node generates a unicast or broadcast route reply (RREP) packet and sends the RREP packet to the source node along the discovered route.

In some examples, while the route discovery command supports the use of both the EUI-64 and the 16 bit short addressing for routing, the MAC module 108 may only allow the latter to be used as a routable address and limit the use of EUI-64 addressing for bootstrapping or direct communication to a neighbor.

Referring now to FIGS. 3B-3D, in order to establish and maintain a route, the nodes in the network include several tables related to routing. In FIG. 3B, the MAC module 108 includes a routing table (RT) that includes the following fields: destination address (D-Add), next hop address to the destination node (NH-Add), status of a route (STAT) and life time of a route to be valid before being expired (Valid). As can be appreciated, the RT may include additional or fewer fields. In FIG. 3C, the MAC module 108 also includes a route request table (RRT) that is maintained during the route discovery to keep track of RREQ packets. The RRT may include the following fields: RREQ ID, source address of a RREQ (S-Add), forward route cost (FRC) from the source to the current node, reverse route cost (RRC) from destination to current node and valid time (VT) of the entry before being expired. The RREQ ID is a number that uniquely identifies a RREQ. As can be appreciated, the RRT may include additional or fewer fields.

In FIG. 3D, the MAC module 108 may also include a Neighbor Table (NT). The neighbor table may include neighbor addresses (Add), the reverse $LQI_{rev}$ associated with the neighbor address, reverse modulation $MOD_{rev}$ associated with the neighbor, and an indication if the information in the NT is valid (Valid). As can be appreciated, the NT may include additional or fewer fields.

The reverse $LQI_{rev}$ and reverse modulation $MOD_{rev}$ may be collected as part of channel estimation the first time that a node tried to communicate with a neighbor node. The values may be periodically updated during communication afterward.

There are several packets that are used by the nodes to establish a route. The RREQ packet is a broadcast or unicast packet originated by the source node and forwarded by intermediate nodes to the destination node. Fields of the RREQ packet include route cost (RC), RREQ ID, weak links count (WL), source address, and destination address. As can be appreciated, the RREQ packet may include additional or fewer fields. The RC field corresponds to the accumulated link cost (LC) from the source node to the current node. The WL field corresponds to the number of weak links. In some examples, the LQI may be used to declare a link as weak link if the LQI of a hop is below predetermined threshold.

The route reply (RREP) packet is a unicast or broadcast packet originated by the destination node and forwarded by intermediate nodes along the discovered route to the source node. The packet includes following main fields: RC, RREQ ID, WL, source address and destination address. As can be appreciated, the RREP packet may include additional or fewer fields.

The route error (RERR) packet is a unicast or broadcast packet identifying an error in route discovery originated by the intermediate node not being able to repair the link and sent back to the final destination. The fields of the packet include an error code and the destination address of the unreachable node.

During the route discovery, the source node originates the RREQ packet with an incremental RREQ ID and the destination address. The source node sends the RREQ packet to neighbor nodes. The intermediate nodes that receive the RREQ packet add the RREQ packet to the RREQ Table and sends the RREQ packet if another copy of the same RREQ packet identified by the RREQ ID and source address is not found in the RREQ Table. In some examples, the RRT is updated and sent if another copy exists but has a worse <RC, WL> as shown below in conjunction with FIG. 6. Prior to sending, the intermediate nodes update the RC and WL fields and add a route to the source node in the routing table of the intermediate node.

When the destination node receives the RREQ packet, if any other RREQ packet with the same source node and RREQ ID with better forward RC (or <RC, WL> tuple) is found in RRT, the received RREQ packet is discarded. Otherwise, the destination node updates the RRT with the new RREQ packet and updates the RT with the new route. The destination node also generates the unicast RREP packet and sends the RREP packet along the selected route back to the source node.

The RREP packet is forwarded back to the source node. The WL and RC fields are updated by each intermediate node along the selected route. In order to limit the forwarding of multiple RREP packets, the intermediate node only forwards the RREP packet if the intermediate node can find an entry from the same source with the same RREQ ID with worse reverse RC. A route to the destination is also added to the RT. Once the source node receives the RREP packet, the source node updates the RT with the route to the destination node.

If an intermediate node is unable to forward the RREP packet, the intermediate node may initiate a route repair (RREQ with repair flag set) packet to find an alternative route to the source node. The failure can be reported back to the destination node using a unicast route error (RERR) packet. All other nodes forwarding the RERR packet back to the destination node also update the RTs by removing the source node.

According to the present disclosure, in order to improve the route discovery performance for PLC systems, asymmetrical routes can be avoided. In PLC systems, it is frequently observed that a link between two nodes may be asymmetrical. In other words, the quality of the channel is significantly different depending on the communication direction. For example, the receiver SNR can be very high for sending packets from node A to node B and very low for sending packets from node B to node A. This asymmetry results in different optimum modulation parameters in the forward link relative to the reverse link to establish a robust communication.

In some examples of the MAC module, each unicast packet to a neighbor node or intermediate node is responded with an acknowledgment packet (ACK). Therefore, in order to have steady data communications from one node to another node, both forward and reverse channels along the selected route should be robust enough regardless of direction.

A route discovery command may not specifically propose any method to calculate the Link Cost (LC) between nodes. In some examples of the MAC module according to the present disclosure, a mathematical formula may be used compute the Link Cost based on several parameters, including the Modulation (MOD) and Link Quality Indicator (LQI). A node is capable of calculating the forward $LQI_{for}$ and $MOD_{for}$ of a received RREQ packet. In node B, $LQI_{A \to B}$ and $MOD_{A \to B}$ can be determined from the RREQ packet. However, the reverse channel LQI and MOD cannot be determined from the RREQ packet. There may be also no provision in a route discovery command to allow communicating the reverse channel quality to an intermediate node to take into account in its LC calculation.

In some examples of the MAC module 108 according to the present disclosure, each node includes a Neighbor Table (NT). In node B, the NT entry associated with node A includes the reverse $LQI_{rev}$ and $MOD_{rev}$ collected as part of channel estimation the first time that node B tried to communicate with node A and periodically updated during communication afterward.

In some examples, the channel estimation uses an adaptive tonemap request/response to determine the reverse channel information. In this method, the node B can initiate the channel estimation by sending a packet with tonemap request flag set to invoke channel estimation on this packet in node A. Node B sends the result in a tonemap response packet from node A to node B. The tonemap response includes $LQI_{rev}$ and $MOD_{rev}$. This method generates an up to date $LQI_{rev}$ and $MOD_{rev}$ using the existing packet format of the MAC module. However it has the overhead of extra communication of sending and receiving the tone map request and response in the middle of route discovery.

If the reverse channel information of node A can be found in the NT of node B, then the reverse channel information may be used as $LQI_{rev}$ and $MOD_{rev}$. Otherwise, the measured forward $LQI_{for}$ and $MOD_{for}$ is used as the best available estimate of $LQI_{rev}$ and $MOD_{rev}$. This method is easy to implement without any communication overhead.

If reverse channel information is not found in NT of node B, a unicast or broadcast RREQ and RREQ-ACK message may be generated by B to acquire $LQI_{rev}$ and $MOD_{rev}$. This approach requires new message construct to the messages to measure the reverse LQI and Modulation by sending a RREQ which includes the next hop address (A) from B, measuring $LQI_{B \to A}$ and $MOD_{B \to A}$ from that packet in node A and reporting it back to B using a RREQ-ACK message.

In some examples, the following formula is used to compute the LC: $LQI=\min\{LQI_{rev}, LQI_{for}\}$, although other formulas may be used. While choosing the minimum of $LQI_{rev}$ and $LQI_{for}$ is conservative, it results in the selection of routes that are robust enough to communicate in either direction. Since both the source node and the destination node will add the same route to the RT once the route discovery is complete, it is important to establish a bidirectional route in presence of asymmetrical channel.

In other examples, weighting factors are used to combine the forward and reverse LQI and Mod. For example, the weighting factors can be biased toward the forward link as it is the direction that the route discovery asked for while maintaining a viable reverse communication (for ACK packets). In other words, LC: $LQI=a*LQI_{rev}+b*LQI_{for}$. Alternately, the LC can be calculated based on any function of forward and reverse LQI and Mod.

When using a route discovery command, if an intermediate node finds the same RREQ ID from the same source node in the RRT, the intermediate node does not rebroadcast or forward the RREQ packet. This means that the first RREQ packet to arrive at an intermediate node is assumed to have the better RC from the source node to the intermediate node as compared to the RREQ packets received later. This assumption may not necessarily be true because a route request associated with a better route (lower RC) might have been delayed in some intermediate nodes due to the processing load of prior nodes and not because of a worse channel condition. While this approach reduces the number of broadcast or unicast RREQ packets, it does not necessarily provide the optimum route.

To address this issue, later RREQ packets may be rebroadcasted or forwarded only if their associated route cost and weak link parameters are lower than the currently selected route. In some examples, the RC of the later RREQ packet needs to be better than the RC of the currently selected route by a predetermined amount before the later RREQ is rebroadcasted or forwarded. The value of the predetermined amount may be selected to balance network congestion and route efficiency. This approach improves the route optimization while still trying to reduce the broadcasts or forwarding of RREQ packets if they do not correspond to significantly better routes.

The destination node generates a RREP packet in response to every RREQ packet that is received provided that the RC is lower than the previously received RREQ packets with the same source and RREQ ID. This results in sending multiple RREP packets through multiple routes. In some examples, the source node waits a predetermined period to make sure that there is no better RREP packet in transit before sending the RREP packet(s). This approach may result in increased traffic of unnecessary RREP packets in the network in a typically large PLC system.

In order to reduce traffic due to the RREP packets, the waiting period in the source node to collect all RREPs is moved to the destination node. After receiving the first RREQ packet, the destination node waits for a predetermined period to make sure no other RREQ packets with a better RC is in transit. At the end of the predetermined period, the best route is chosen and a RREP packet associated with the selected RREQ packet is generated and sent to the source node.

In a PLC bootstrapping procedure, a new device sends a beacon request to all neighbors to find a neighbor node already associated to the network to act as a forwarder during association and authentication. The neighbor nodes in the network respond with a beacon response. In a power line network, several hundred devices can be connected to the same network coordinator over the shared channel. After power-up of the devices (e.g. after a black out), the devices start sending beacons. At this point, only a few devices are associated and able to respond. As more devices are associated, more beacons responses are sent in response to a beacon, which makes the network more congested. To alleviate this problem, a random and increasing delay is defined during the power up procedure of a node to avoid back-to-back retry if an association attempt failed. The increasing delay upon each join failure accounts for the increasing traffic of beacon responses as more devices are joined to the network to reduce the overall traffic giving a better opportunity to the joining devices to complete the association without fatal interruptions.

A ghost (or orphan) node is defined as a device that had been successfully associated to a network and had a very good communication with network coordinator (very low RC). However, due to dynamic changes in the behavior of power line network, the bidirectional communication is no longer possible and the ghost node is not aware of this change. In other words, the ghost node still thinks that it has a perfect route to the network coordinator. Since a typical application requires infrequent access to a device, this condition may exist in the ghost node for some time before the ghost node or network coordinator notices the failure in the link. During this period, the ghost node continues to respond to any beacon request from a new associating device and may cause a series of repeated failures of association procedure for the new associating device.

To alleviate this problem, a route cost to network coordinator field is added to the payload of the beacon response. Once the first association through a ghost node fails, a very high value of the route cost to the network coordinator is reported in any future beacon responses of the ghost node, indicating that although the ghost device is part of the network, it does not currently have a sustainable communication link to the network coordinator. The associating node would use this information to avoid selecting the ghost node for the next attempt.

The broadcast RREQ packets are retransmitted by every node at least once until the RREQ reaches the maximum allowed number of hops. This could result in a very high traffic of RREQ packets in the network for the route discovery period. In a working network, the route discovery is not launched unless a connection is lost or a manual route optimization is ordered. Following the initialization of the network when all devices are powered up, significant traffic of RREQ packets are expected as the routing information is acquired only through route discovery following the successful association of a new device. In other words, neither the network coordinator nor the newly joined device has any route to each other and a route discovery procedure needs to be launched from one side to establish a route. This could lead to an overall network congestion for a long period of time during which normal communication or association of new devices is erratic.

According to the present disclosure, the existing route used during the association is added as the default route between a node such as a device and another node such as a network coordinator. Since the route has been used already for both directions to exchange authentication packets, there is no need to initiate a new route discovery and the RT can be updated directly. This approach may initially seem to result in choosing only a possible route rather than an optimized route and cause the number of hops in a tree-like network to grow. However, the selected route is in fact the best available route. Each beacon response includes the RC of the node such as the device to the other node such as the network coordinator. Therefore during association, the joining node can select the node that provides the route with the lowest cost. This improvement drastically reduces the RREQ traffic in the network.

For example, the LC may be computed as follows. The RC is defined as the sum of all the LCs on a route. An example of a link cost calculation may be found in Appendix B of ITU-T G.9956, Telecommunication Standardization Sector OF ITU, Corrigendum 1, (09/2012), which is incorporated herein by reference. While a particular example of the LC is described therein, the LC may take into other parameters including but not limited to PHY transmission parameters, number of hops, etc. . . . . As can be appreciated, the link cost computation algorithm is implementation dependent.

The proposed method can further create separate optimized routes across the network depending on the direction of communication. For example, if node A requests a route discovery to node B, the $LQI_{for}$ and $MOD_{for}$ between each two nodes can be used provided that the reverse link is not weak. This results in a route from node A to node B that is optimum for forward packets while the reverse link is viable for short ACK packets.

The route discovery command marks installed routes as forward or reversed optimized in the routing table and depending on the initiator of the route discovery. Therefore, if node A initiates route discovery, it will have an optimum route from node A to node B. While node B also has the same route back to node A, the route is not optimized for communication from node B to node A as long as an optimized route from node B to node A does not exist. Once node B initiates a route discovery to node A, it will have separate optimized route from node B to node A.

Figure 5:
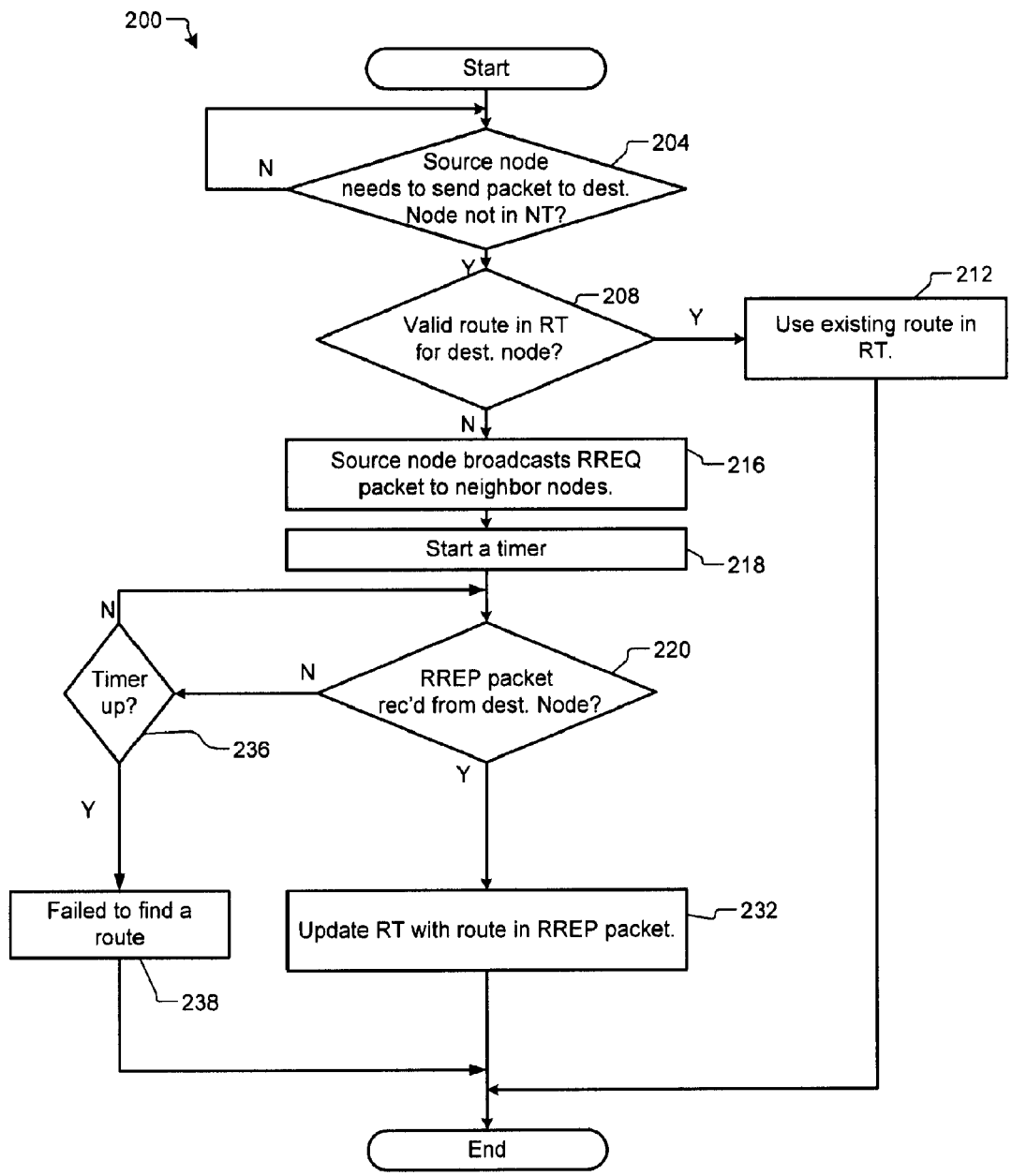
FIG. 5 is a flowchart illustrating an example of operation of a source node of a PLC system according to the present disclosure.

Referring now to FIGS. 5-8, flowcharts illustrating example methods for operating the routing module of the source node, the intermediate node and the destination node are shown. In FIG. 5, operation of the source node is illustrated. At 204, the source node determines whether it needs to send a packet to a destination node that is not in the NT. If 204 is true, the source node determines whether a valid route exists in the routing table for the destination node at 208. If 208 is true, the source node uses the existing route in the routing table of the source node at 212.

If a valid route is not in the routing table for the destination node, the source node continues with 216 and the source node sends the route request (RREQ) packet to a neighbor node (which may or may not already be in NT) and starts a timer 218. At 220, the source node determines whether a route reply (RREP) packet has been received from the destination node. When the RREP packet has been received, at 232, control updates the routing table with the route specified in the RREP packet. At 236, if the timer expires without receiving the RREP packet at 220, the route discovery fails at 238.

Figure 6:
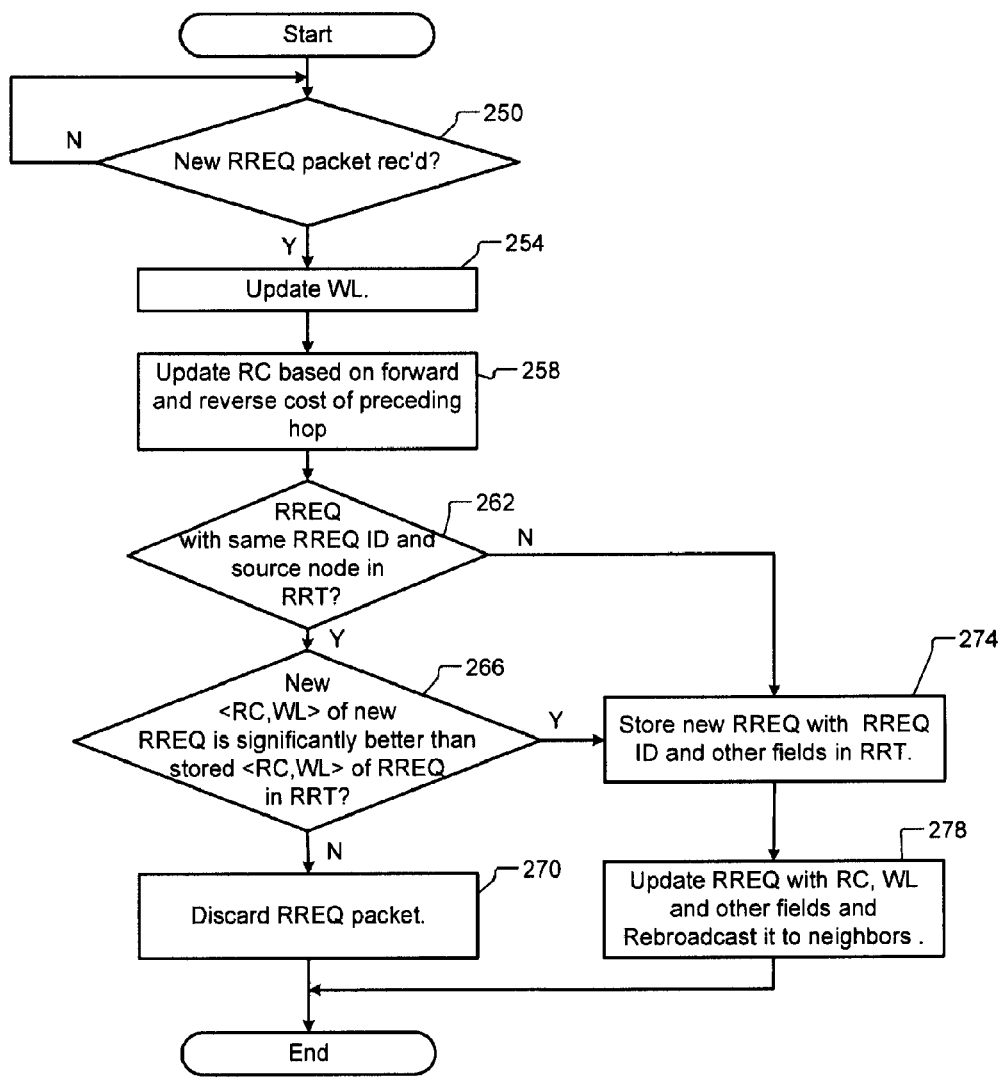
FIG. 6 is a flowchart illustrating an example of operation of an intermediate node of a PLC system when a route request packet is received according to the present disclosure.

Referring now to FIG. 6, operation of an intermediate node in response to a RREQ packet being received is shown. At 250, the intermediate node determines whether a new RREQ packet has been received. If 250 is true, the intermediate node updates the weak links field at 254. At 258, the intermediate node updates the route cost based on forward and reverse cost of the preceding hop. At 262, the intermediate node determines whether the RREQ with the same RREQ ID with the same source node is located in the route request table. If 262 is true, the intermediate node determines at 266 whether the new <RC,WL> of new RREQ packet is significantly better than stored <RC,WL> of the route request with the same RREQ ID and source node. If 266 is false, the intermediate node discards the new RREQ packet at 270. If 262 is false or 266 is true, the intermediate node stores the new RREQ with RREQ ID and other fields in the route request table at 274. At 278, the intermediate node updates the RREQ packet and sends the updated RREQ packet to neighbor nodes.

Figure 7:
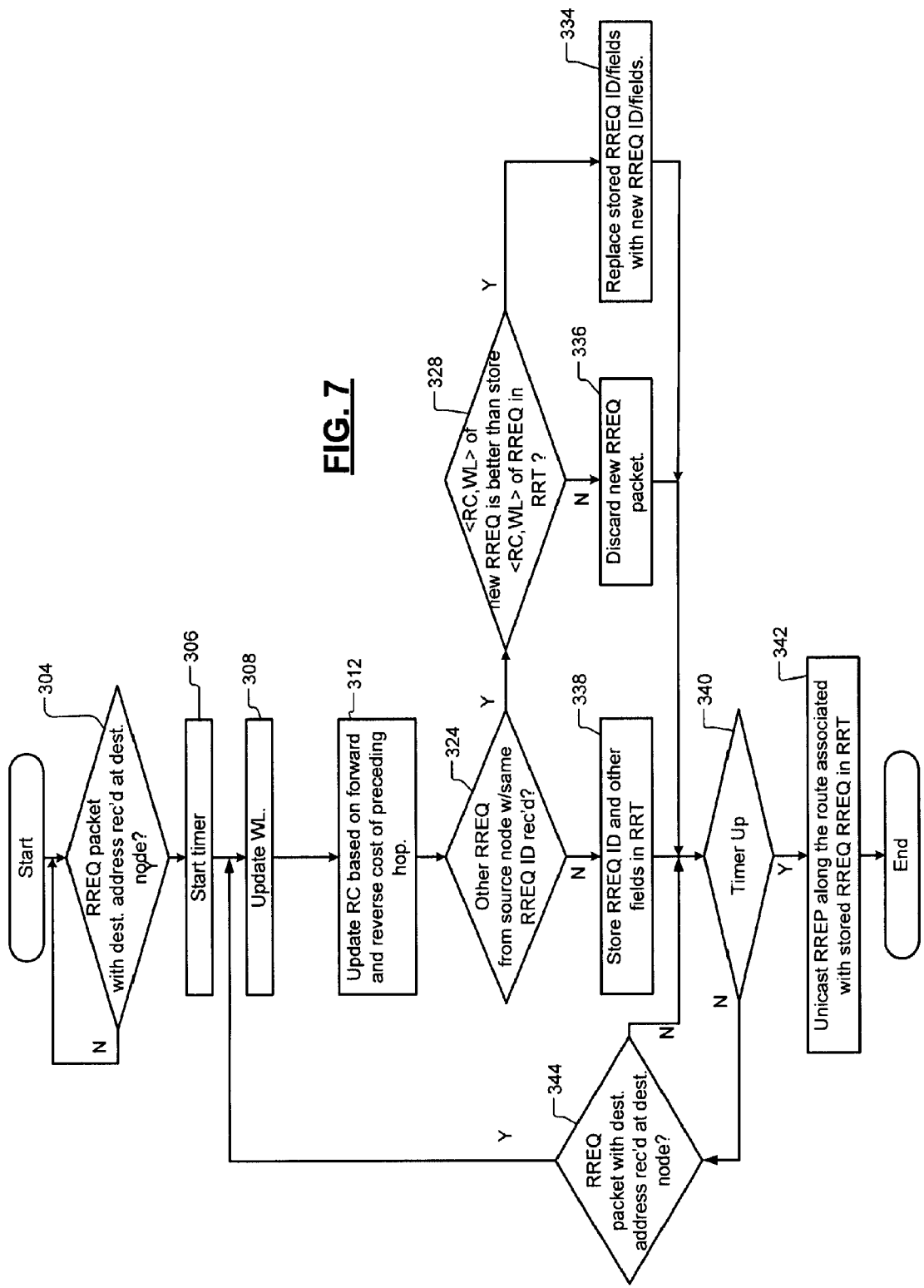
FIG. 7 is a flowchart illustrating an example of operation of a destination node of a PLC system according to the present disclosure.

Referring now to FIG. 7, operation of a destination node is shown when a RREQ packet is received. At 304, the destination node determines whether a RREQ packet with the destination address has been received at the destination node. If 304 is true, the destination node starts a timer at 306 and the destination node updates the weak links field at 308. At 312, the destination node updates the route cost based on the forward and reverse cost of preceding hop. At 324, the destination node determines whether it received other RREQ packets from the source node with the same RREQ ID in the RRT. If 324 is true, the destination node determines whether the stored <RC,WL> of the RREQ in the route request table is worse than the new <RC,WL> of the new RREQ packet at 328. If 328 is true, the destination node replaces the stored route request ID and corresponding fields with the new RREQ ID and corresponding fields at 334.

If 328 is false, the destination node discards the new RREQ packet. If 324 is false, the destination node stores the RREQ ID and other fields in the route request table at 338. The destination node continues from 334, 336 and 338 with 340 where the destination node determines whether the timer is up. If 340 is true, the destination node sends a unicast RREP along with the selected route as indicated by the stored RREQ in the RRT to the source node at 342. If 340 is false, the destination node determines at 344 whether a RREQ packet with the destination address has been received at the destination node. If 344 is false, control continues with 340. If 344 is true, control continues to 308.

Figure 8:
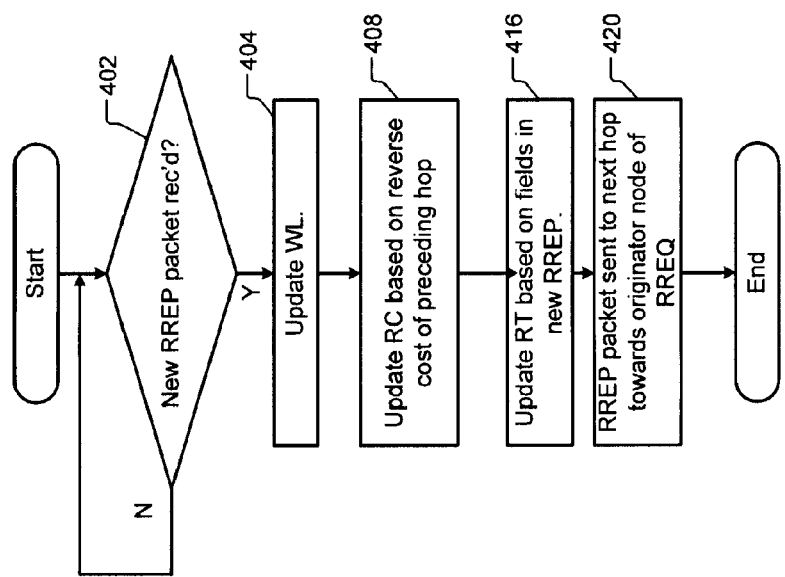
FIG. 8 is a flowchart illustrating an example of operation of an intermediate node of a PLC system when a route reply packet is received according to the present disclosure.

Referring now to FIG. 8, operation of an intermediate node in response to a RREP packet being received is shown. At 402, the intermediate node determines whether it has received a RREP packet. If 402 is true, the intermediate node updates weak links fields at 404. At 408, the intermediate node updates the route cost based on the reverse cost of the preceding hop. At 416, the intermediate node updates the routing table based on fields in the new RREP packet. At 420, the intermediate node sends the RREP packet to the next hop in the routing table (towards the source node).

Figure 9:
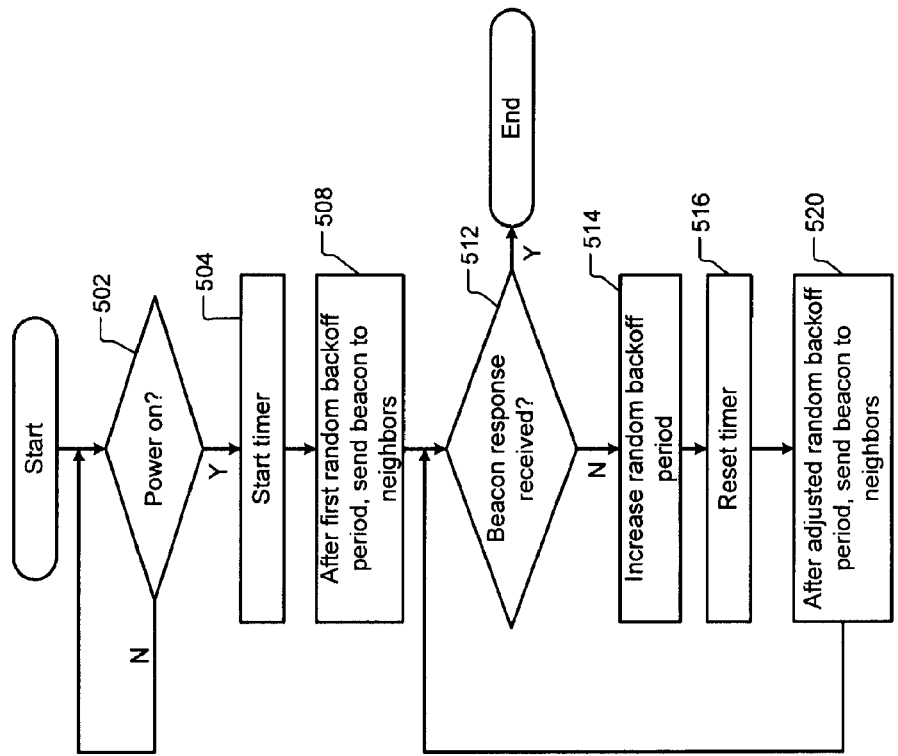
FIG. 9 is a flowchart illustrating an example of association of a node.

Referring now to FIG. 9, at 502, a node determines whether power is on. When power is on at 502, the node starts a timer at 504. At 508, after a first random back off period, the node sends a beacon to neighbors in the neighbor table. At 512, the node determines whether a beacon response is received. If 512 is true, association of the node is complete and control ends. If 512 is false, the node increases the random back off period. At 516, the node resets the timer. At 520, the node sends the beacon to the neighbor nodes in the neighbor table after the adjusted random back off period. Control returns to 512.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A power line communication (PLC) system, comprising:
   a source node;
   a plurality of intermediate nodes; and
   a destination node,
   wherein each of the source node, the plurality of intermediate nodes and the destination node comprise a PLC interface including:
      a medium access control (MAC) module comprising a routing module; and
      a physical layer (PHY) module in communication with the MAC module and comprising a transceiver configured to transmit and receive data over a power line,
   wherein the routing modules of the source node, one or more of the intermediate nodes, and the destination node establish a route from the source node to the destination node via one or more selected ones of the plurality of intermediate nodes,
   wherein the route is selected using a route cost that is calculated based on link costs of a plurality of hops in the route from the source node to the destination node,
   wherein the link costs are based on forward link costs and reverse link costs,
   wherein when the destination node receives a route request packet, including a route cost, from one of the intermediate nodes corresponding to a neighbor node of the destination node, the destination node waits a predetermined period to receive one or more additional route request packets,
   wherein, after waiting the predetermined period, the destination node identifies a selected one of (i) the route request packet and (ii) the one or more additional route request packets having a lowest route cost, and
   wherein the destination node transmits a unicast route reply packet to the source node identifying the selected route.

2. The PLC system of claim 1, wherein the route cost is further based on identifying weak links in the plurality of hops in the route from the source node to the destination node.

3. The PLC system of claim 2, wherein one of the weak links is determined based on a comparison of a reverse link quality of one of the hops to a predetermined reverse link quality.

4. The PLC system of claim 1, wherein the MAC module of one of the plurality of intermediate nodes calculates one of the forward link costs of one of the hops based on a forward link quality indicator and a forward modulation.

5. The PLC system of claim 1, wherein the MAC module of one of the plurality of intermediate nodes includes a routing table, a neighbor table and a route request table.

6. The PLC system of claim 5, wherein the routing module of the one of the plurality of intermediate nodes determines one of the reverse link costs of one of the hops based on a reverse link quality indicator and a reverse modulation.

7. The PLC system of claim 6, wherein the reverse link quality indicator and the reverse modulation are stored in the neighbor table of the one of the plurality of intermediate nodes when the one of the plurality of intermediate nodes associates with a neighbor node.

8. The PLC system of claim 5, wherein the source node sends a route request packet to neighbor nodes in the neighbor table of the MAC module of the source node to initiate a route to the destination node.

9. The PLC system of claim 1, wherein the routing module of the one of the plurality of intermediate nodes determines one of the reverse link costs by:
  requesting a tone map from a node transmitting a route request packet received by the one of the plurality of intermediate nodes; and
  calculating the reverse link cost based a tone map reply from the node transmitting the route request packet received by the one of the plurality of intermediate nodes.

10. The PLC system of claim 1, wherein one of the link costs is calculated by selecting a minimum value of a forward link cost and a reverse link cost for the one of the hops.

11. The PLC system of claim 1, wherein one of the link costs is calculated based on a function of a forward link cost and a reverse link cost.

12. The PLC system of claim 1, wherein the route cost is based on a sum of link costs of links from the source node to the destination node.

13. The PLC system of claim 1, wherein the transceiver operates in a frequency band from 1 kHz to 600 kHz.

14. The PLC system of claim 1, wherein the transceiver selectively utilizes normal encoding and repetitive encoding.

15. The PLC system of claim 1, wherein the transceiver interleaves transmit data in both frequency and time.

16. The PLC system of claim 1, wherein a selected forward route established from the source node to the destination node through a first set of the plurality of intermediate nodes is different than a selected reverse route established from the destination to the source node through a second set of the plurality of intermediate nodes wherein the first set is different than the second set.

17. The PLC system of claim 1, wherein:
  when a receiving node receives a route request packet from a sending node and the receiving node does not have reverse channel information for the sending node, the receiving node sends a route request packet to the sending node; and
  the sending node, in response to the route request packet, sends a route request acknowledgement packet to the receiving node including at least one of a reverse link quality indicator and modulation information.

18. The PLC system of claim 1, further comprising a coordinator node, wherein:
  a first node associates with the coordinator node using a first route with a first route cost; and
  when a second node attempts to initiate an association with the coordinator node through the first node using a beacon and the association fails, the first node increases the first route cost to the coordinator node to a higher route cost.

19. The PLC system of claim 18, wherein:
  the higher route cost indicates that the first node does not presently have a sustainable communication link to the coordinator node; and
  the second node uses the higher route cost to avoid selecting the first node when subsequently attempting to initiate an association with the coordinator node.

20. A method for operating a power line communication (PLC) system, comprising:
  establishing a route from a source node to a destination node via one or more selected ones of a plurality of intermediate nodes, wherein each of the source node, the plurality of intermediate nodes, and the destination node comprises a PLC interface for transmitting and receiving data over a power line;
  selecting the route using a route cost that is calculated based on link costs of a plurality of hops in the route from the source node to the destination node, wherein the link costs are based on forward link costs and reverse link costs;
  wherein when the destination node receives a route request packet, including a route cost, from one of the intermediate nodes corresponding to a neighbor node of the destination node, the destination node waits a predetermined period to receive one or more additional route request packets;
  after waiting the predetermined period, identifying a selected one of (i) the route request packet and (ii) the one or more additional route request packets having a lowest route cost; and
  transmitting a route reply packet from the destination node to the source node identifying the selected route.

21. The method of claim 20, further comprising identifying weak links in the plurality of hops in the route from the source node to the destination node, wherein the route cost is further based on the weak links.

22. The method of claim 21, wherein determining one of the weak links based on a comparison of a reverse link quality of one of the hops to a predetermined reverse link quality.

23. The method of claim 21, further comprising calculating one of the forward link costs of one of the hops based on a forward link quality indicator and a forward modulation.

24. The method of claim 21, wherein one of the plurality of intermediate nodes includes a routing table, a neighbor table and a route request table.

25. The method of claim 24, further comprising, at the one of the plurality of intermediate nodes, determining one of the reverse link costs of one of the hops based on a reverse link quality indicator and a reverse modulation.

26. The method of claim 25, wherein the reverse link quality indicator and the reverse modulation are stored in the neighbor table of the one of the plurality of intermediate nodes when the one of the plurality of intermediate nodes associates with a neighbor node.

27. The method of claim 20, wherein the one of the plurality of intermediate nodes determines one of the reverse link costs by:
  requesting a tone map from a node transmitting a route request packet received by the one of the plurality of intermediate nodes; and
  calculating the reverse link cost based a tone map reply from the node transmitting the route request packet received by the one of the plurality of intermediate nodes.

28. The method of claim 20, further comprising calculating one of the link costs by selecting a minimum value of a forward link cost and a reverse link cost for the one of the hops.

29. The method of claim 20, further comprising calculating one of the link costs based on a function of a forward link cost and a reverse link cost.

30. The method of claim 24, further comprising broadcasting or forwarding a route request packet from the source node to neighbor nodes in the neighbor table of the source node to initiate a route to the destination node.

31. The method of claim 20, wherein the route cost is based on a sum of link costs of links from the source node to the destination node.

32. The method of claim 20, further comprising transmitting and receiving data in a frequency band from 1 kHz to 600 kHz.

33. The method of claim 20, further comprising selectively using normal encoding and repetitive encoding.

34. The method of claim 20, further comprising selectively interleaving transmitted data in both frequency and time.

35. The method of claim 20, further comprising selecting a forward route established from the source node to the destination node through a first set of the plurality of intermediate nodes that is different than a reverse route established from the destination to the source node through a second set of the plurality of intermediate nodes, wherein the first set is different than the second set.

36. The method of claim 20, further comprising:
when a receiving node receives a route request packet from a sending node and the receiving node does not have reverse channel information for the sending node, sending a unicast or broadcast route request packet from the receiving node to the sending node; and
in response to the route request packet, sending a route request acknowledgement packet from the sending node to the receiving node including at least one of a reverse link quality indicator and modulation information.

37. The method of claim 20, further comprising:
associating a first node with a coordinator node using a first route with a first route cost; and
when a second node attempts to initiate an association with the coordinator node using a beacon through the first node and the association fails, increasing the first route cost to a higher route cost.

38. The method of claim 27, wherein:
the higher route cost indicates that the first node does not presently have a sustainable communication link to the coordinator node; and
the second node uses the higher route cost to avoid selecting the first node when subsequently attempting to initiate an association with the coordinator node.

39. A power line communication (PLC) comprising:
a source node;
a plurality of intermediate nodes; and
a destination node,
wherein each of the source node, the plurality of intermediate nodes and the destination node comprise a PLC interface including:
a medium access control (MAC) module comprising a routing module; and
a physical layer (PHY) module in communication with the MAC module and comprising a transceiver configured to transmit and receive data over a power line,
wherein the routing modules of the source node, one or more of the intermediate nodes, and the destination node establish a route from the source node to the destination node via one or more selected ones of the plurality of intermediate nodes,
wherein the route is selected using a route cost that is calculated based on link costs of a plurality of hops in the route from the source node to the destination node,
wherein the link costs are based on forward link costs and reverse link costs,
wherein when one of the intermediate nodes receives a route request packet, the intermediate node updates the route cost and a weak links field of the route request packet,
wherein the route request packet includes an identification field identifying a source node,
wherein when the intermediate node determines that a prior route request packet including the identification field identifying the same source node as the route request packet, the intermediate node compares the route cost and the weak links field of the route request packet with a route cost and a weak links field of the prior route request packet,
wherein the intermediate node selects the route request packet in response to the route cost and the weak links field being less than the route cost and the weak links field of the prior route request packet by a predetermined amount and rebroadcasts or forwards the route request packet to neighbor nodes, and
wherein the intermediate node discards the route request packet in response to the route cost and the weak links field being not less than the route cost and the weak links field of the prior route request packet by the predetermined amount.

40. A power line communication (PLC) comprising:
a source node;
a plurality of intermediate nodes; and
a destination node,
wherein each of the source node, the plurality of intermediate nodes, and the destination node comprise a PLC interface including:
a medium access control (MAC) module comprising a routing module; and
a physical layer (PHY) module in communication with the MAC module and comprising a transceiver configured to transmit and receive data over a power line,
wherein the routing modules of the source node, one or more of the intermediate nodes, and the destination node establish a route from the source node to the destination node via one or more selected ones of the plurality of intermediate nodes,
wherein the route is selected using a route cost that is calculated based on link costs of a plurality of hops in the route from the source node to the destination node, and
wherein the link costs are based on forward link costs and reverse link costs,
wherein when turned on, the PLC interface transmits a beacon to initiate a first one of N association attempts with a PLC network, wherein N is an integer greater than 0, wherein in response to the first one of the N association attempts failing, the MAC module waits a first random delay period before initiating a second one of the N association attempts, wherein in response to the second one of the association attempts failing, the MAC module waits a second random delay period before initiating others of the N association attempts, and wherein each random delay period associated with a successive one of the N association attempts is longer than a preceding one of the N association attempts.

41. A method for operating a power line communication (PLC) system, comprising:
establishing a route from a source node to a destination node via one or more selected ones of a plurality of intermediate nodes, wherein each of the source node, the plurality of intermediate nodes, and the destination node comprises a PLC interface for transmitting and receiving data over a power line;

selecting the route using a route cost that is calculated based on link costs of a plurality of hops in the route from the source node to the destination node, wherein the link costs are based on forward link costs and reverse link costs;

updating the route cost and a weak links field of a route request packet when one of the plurality of intermediate nodes receives a route request packet, wherein the route request packet includes an identification field identifying a source node;

determining whether the one of the plurality of intermediate nodes stored a prior route request packet including the identification field identifying the same source node as the route request packet;

comparing the route cost and the weak links field of the route request packet with a route cost and a weak links field of the prior route request packet;

using the route request packet in response to the route cost and the weak links field being less than the route cost and the weak links field of the prior route request packet by a predetermined amount and sending the route request packet to neighbor nodes; and discarding the route request packet in response to the route cost and the weak links field being not less than the route cost and the weak links field of the prior route request packet by the predetermined amount.

42. A method for operating a power line communication (PLC) system, comprising:

in response to a PLC interface turning on:

establishing a route from a source node to a destination node via one or more selected ones of a plurality of intermediate nodes;

selecting the route using a route cost that is calculated based on link costs of a plurality of hops in the route from the source node to the destination node, wherein the link costs are based on forward link costs and reverse link costs;

transmitting a beacon to initiate a first one of N association attempts with a PLC network;

in response to the first one of the N association attempts failing, waiting a first random delay period before initiating a second one of the N association attempts; and in response to the second one of the association attempts failing, waiting a second random delay period before initiating others of the N association attempts, wherein each random delay period associated with a successive one of the N association attempts is longer than a preceding one of the N association attempts.

* * * * *

UNITED STATES PATENT AND TRADEMARK OFFICE
CERTIFICATE OF CORRECTION

| | |
|---|---|
| PATENT NO. | : 9,008,073 B1 |
| APPLICATION NO. | : 13/708008 |
| DATED | : April 14, 2015 |
| INVENTOR(S) | : Kaveh Razazian et al. |

It is certified that error appears in the above-identified patent and that said Letters Patent is hereby corrected as shown below:

In the Specification:

Column 4, Line 52 — Delete "form" and insert --from--

In the Claims:

Column 15, Line 39, Claim 38 — Delete "27," and insert --37,--

Column 15, Line 46, Claim 39 — Before "comprising:", insert --system,--

Column 16, Line 25, Claim 40 — After "(PLC)", insert --system,--

Signed and Sealed this
Sixth Day of October, 2015

Michelle K. Lee
*Director of the United States Patent and Trademark Office*